United States Patent
Gandhi et al.

[19]

[11] Patent Number: 5,955,803
[45] Date of Patent: Sep. 21, 1999

[54] DEVICE FOR COOLING A MOTOR IN A CLIMATE CONTROL SYSTEM

[75] Inventors: Bhupen C. Gandhi, Dearborn Heights; Paul G. Stever, Canton; Todd Everett Smith, Farmington Hills, all of Mich.

[73] Assignee: Ford Motor Company, Dearborn, Mich.

[21] Appl. No.: 09/206,432

[22] Filed: Dec. 7, 1998

[51] Int. Cl.⁶ .................................................. H02K 9/00
[52] U.S. Cl. .................................. 310/52; 310/57; 310/89
[58] Field of Search .................................. 310/52, 57, 62, 310/63, 89, 58, 59

[56] References Cited

U.S. PATENT DOCUMENTS

| | | | |
|---|---|---|---|
| 3,243,618 | 3/1966 | Ward | 310/88 |
| 4,092,556 | 5/1978 | Mabuchi | 310/57 |
| 4,119,873 | 10/1978 | Sakurai | 310/56 |
| 4,121,126 | 10/1978 | Armor et al. | 310/59 |
| 4,623,090 | 11/1986 | Heger | 236/49.1 |
| 4,626,720 | 12/1986 | Fukasaku et al. | 310/62 |
| 4,814,653 | 3/1989 | Hasegawa et al. | 310/90 |
| 4,829,208 | 5/1989 | Uchino | 310/268 |
| 4,866,320 | 9/1989 | Schulz | 310/89 |
| 4,886,429 | 12/1989 | Osada et al. | 417/413.1 |
| 5,236,306 | 8/1993 | Hozak | 416/93 R |
| 5,283,493 | 2/1994 | Hokanson et al. | 415/160 |
| 5,296,772 | 3/1994 | Bradfield et al. | 310/242 |
| 5,350,281 | 9/1994 | Hagshenas | 417/371 |
| 5,364,025 | 11/1994 | Terry | 236/49.1 |
| 5,519,273 | 5/1996 | Keck | 310/71 |
| 5,698,914 | 12/1997 | Shiga et al. | 310/60 A |
| 5,868,312 | 2/1999 | Feldt | 236/49.3 |

*Primary Examiner*—Clayton LaBalle
*Assistant Examiner*—Joseph Waks
*Attorney, Agent, or Firm*—Raymond L. Coppiellie

[57] ABSTRACT

A conduit for providing air flow from an air conditioning housing to a motor for driving a climate control system air blower is disclosed. The blower is located in the air conditioning housing. The air conditioning motor includes a motor housing inlet port for admitting the air flow to the interior of the motor. The conduit comprises a generally cylindrical hose member having a motor housing end and a blower housing end. The blower housing end of the conduit extends through the blower housing wall and into the blower housing and defines a generally cylindrical wall. The generally cylindrical wall includes an angled portion and a stop wall portion opposite the angled portion which cooperate to guide air through the conduit to the motor.

14 Claims, 2 Drawing Sheets

DEVICE FOR COOLING A MOTOR IN A CLIMATE CONTROL SYSTEM

BACKGROUND OF THE INVENTION

1. Field of the Invention

The present invention is directed to a device for cooling a blower motor used in a climate control system. More particularly, the invention is directed to a device for providing cooling air from an air conditioning plenum to the blower motor in the climate control system.

2. Disclosure Information

It is well-known that a stream of air from the passenger compartment of a motor vehicle may be drawn over a temperature sensor, to provide control of the temperature of air discharged into the passenger compartment by the vehicle's climate control system. This air typically is aspirated from the passenger compartment via a conduit connected either to the intake housing of the climate control system blower or to the suction housing of a separate small additional blower mounted behind the dashboard of the motor vehicle. U.S. Pat. No. 4,623,090 discloses a climate control system blower including a dual purpose fan, wherein air is aspirated from the passenger compartment of the motor vehicle by means of supplemental vanes attached to the backside of the impeller of the fan used to provide forced ventilation to the passenger compartment. This configuration, however, does not provide cooling for the blower motor. Without cooling, the motor could possibly become overheated, impairing its ability to function most efficiently.

U.S. Pat. No. 5,364,025, assigned to the assignee of the present invention discloses a combination motor cooler and air aspirator which could be integrated with the blower motor of a motor vehicle climate control system. Such a device provides a tubular coupling from the interior of the passenger compartment to the motor and eliminates the need for a separate small additional blower. This system also provides cooling to the climate control system blower motor.

Other proposals for providing cooling air to an air conditioning blower motor includes that described in U.S. Pat. No. 4,626,720. In the '720 patent, a coupling extends between the air conditioning duct housing and the blower motor. A vacuum is created by the blower to draw air through the coupling to the motor. The arrangement shown in FIG. 1 of the '720 patent illustrates that the coupling extends a small distance into the duct. Similar arrangements are shown in FIGS. 1A and 1B. In FIG. 1A, a tubular hose 12 extends through the plenum or duct sidewall 14 into an open area of the duct 16. Air flow is shown by arrows. In FIG. 1B, the hose 12 is flush with the sidewall 14. In both arrangements, very little air flows into the hose 12. This is because, in FIG. 1A, the air flow strikes the side of the hose 12 and creates a "dead zone" 18 or is forced over the hose, not into it. In FIG. 1B, the air flows over the top of the hose opening and because a vacuum is not created by the motor, the air is not drawn into the hose 12. Furthermore, the air flowing in FIG. 1B could create a venturi effect and draw air away from the motor, causing increased heating.

Therefore, there is a need for a device which maximizes the amount of air flowing from the air conditioning plenum and through a hose into the motor.

SUMMARY OF THE INVENTION

It is an object of the present invention to provide a hose design which maximizes air flow to a blower motor of an air conditioning system. The present invention overcomes the disadvantages of the prior art by providing an apparatus for providing air flow to a motor which drives a climate control system air blower. The apparatus comprises a motor housing having an inlet port disposed in a wall thereof and a blower housing having an outlet port in a wall thereof. The apparatus further comprises a conduit for communicating air from the blower housing outlet port to the motor housing inlet port. The conduit includes a motor housing end and a blower housing end and a predetermined length of hose therebetween. The blower housing end of the conduit extends through the housing wall and into the blower housing and defines a generally cylindrical wall. The generally cylindrical conduit wall includes an angled portion and a stop wall portion opposite the angled portion. In one embodiment, the stop wall portion of the generally cylindrical wall extends approximately 180 degrees around the circumference of the wall and the angled portion of the generally cylindrical wall extends approximately 180 degrees around the circumference of the wall. In another embodiment, the angled portion of the generally cylindrical wall includes an exterior angled portion and an interior angled portion, both extending at an angle of between three and 45 degrees to the plane of the blower housing wall, but in converging relationship to one another.

It is an advantage of the present invention that air flow to the motor from the blower hosing is increased, thus prolonging the life and efficiency of the blower motor. These and other objects, features and advantages of the present invention will become apparent from the drawings, detailed description and claims which follow.

BRIEF DESCRIPTION OF THE DRAWINGS

The novel features which are characteristic of the present invention are set forth with particularity in the appended claims. The invention itself, however, both as to structure and method of use will best be understood from the accompanying description of a specific embodiment when read in connection with the drawings in which:

DETAILED DESCRIPTION OF THE PREFERRED EMBODIMENTS

Figure 2:
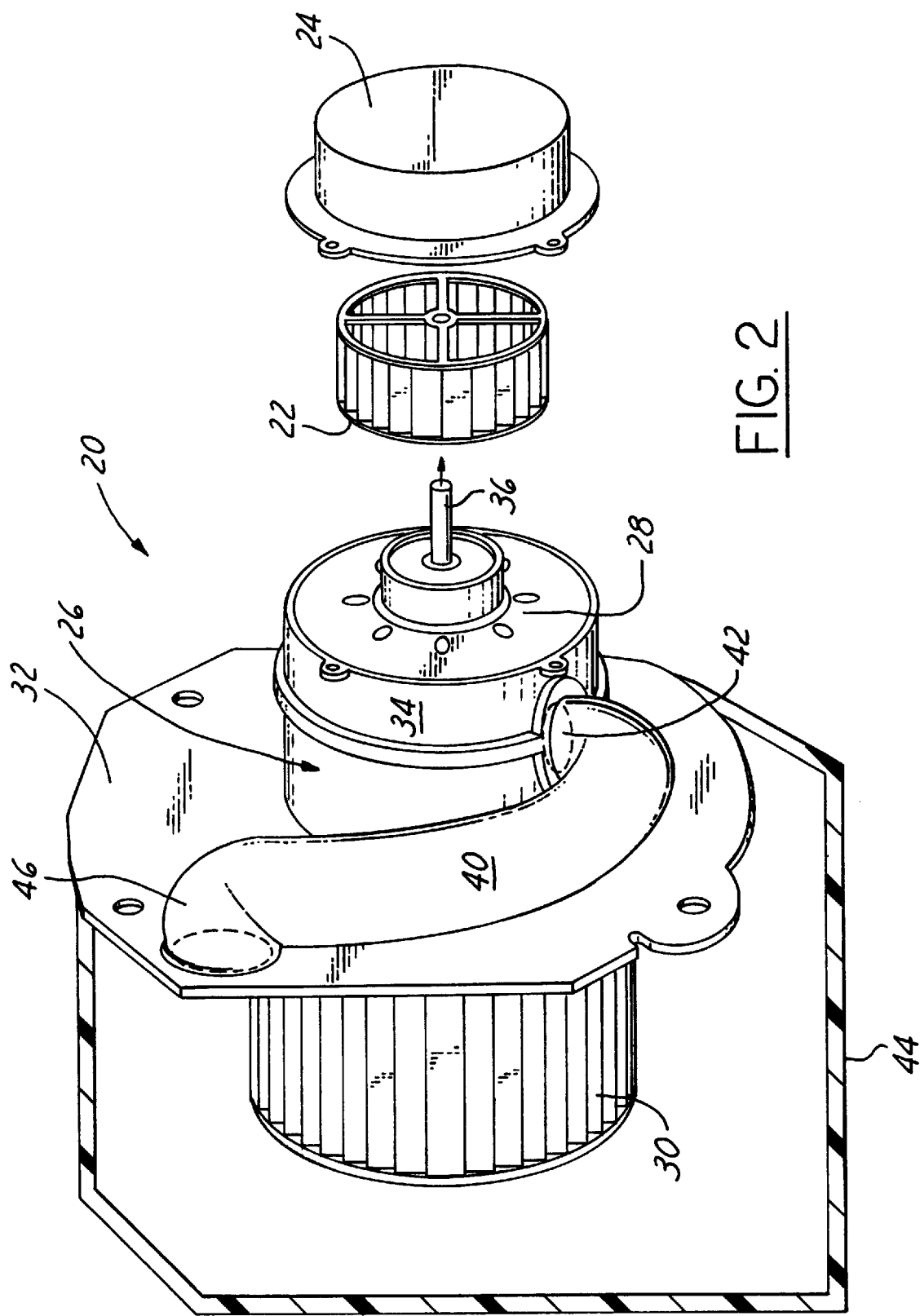
FIG. 2 is an exploded perspective view of a motor and device for cooling the motor structured in accord with the principles of the present invention.

Referring now to FIG. 2, there is shown generally at 20 a motor vehicle climate control system blower/ motor combination according to the present invention. The combination 20 comprises, inter alia, an aspirator blower wheel 22 and a discharge housing 24, although the present invention operates in climate control systems which do not such an aspirator blower wheel. The aspirator shown herein is merely shown an one example of components of an air conditioning system and is not a limitation upon the present invention. The aspirator blower wheel 22 and discharge housing 24 are coupled to a motor vehicle climate control system air blower 26. The air blower 26 includes a permanent magnet-type direct current electric motor 28 which drives a conventional blower wheel 30. The motor 28 is mounted on a sidewall 32 of the blower housing (or plenum) and extends away from the blower housing as shown. The motor 28 includes a motor housing 34 and a shaft 36 extending through the housing 34. In known fashion, the aspirator blower wheel 22 is mounted onto the shaft 36 and the discharge housing 24 is secured to the motor housing 34 by means of conventional fasteners (not shown).

Figure 1A:
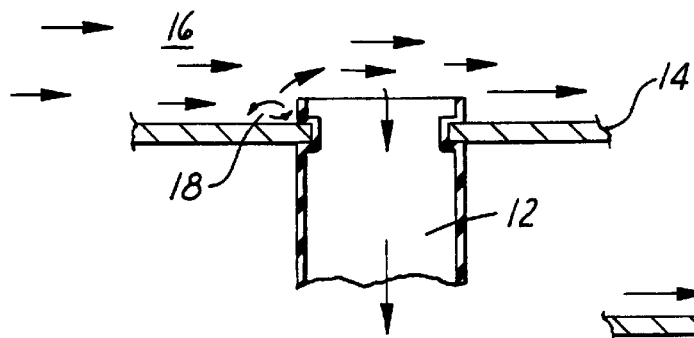
FIGS. 1A and 1B are cross-sectional views of known, prior art devices for providing motor cooling.
Figure 1B:
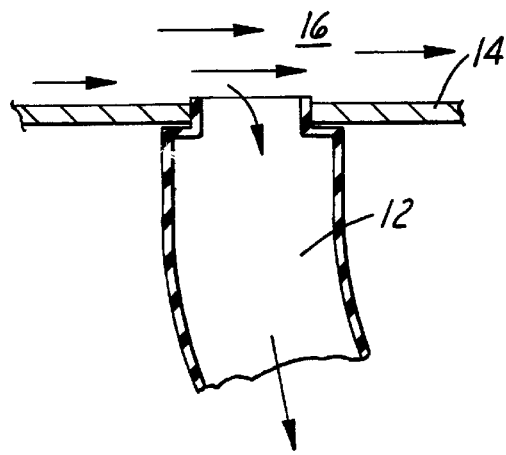
Figure 3:
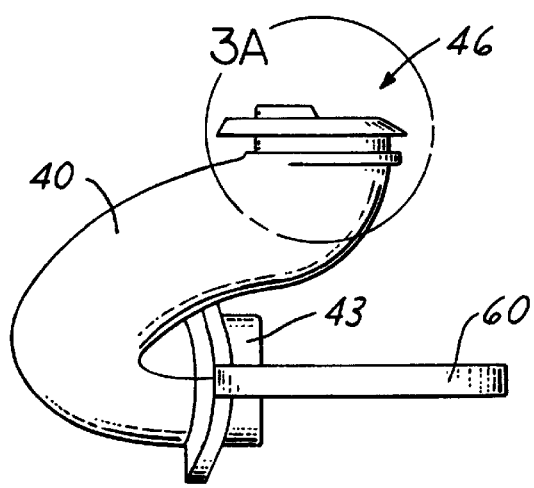
FIG. 3 is a perspective view of the device of FIG. 2.
Figure 3A:
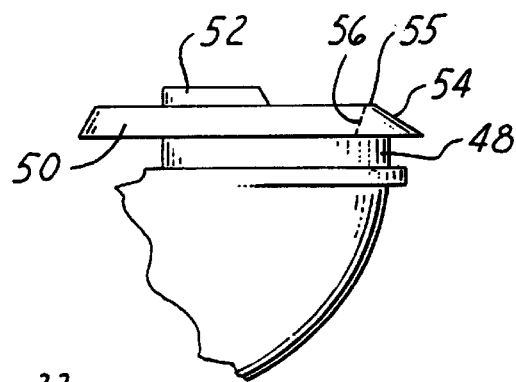
FIG. 3A is an enlarged view of one portion of the device of FIG. 3.

A hose 40 extends between the sidewall 32 of the blower housing and the motor housing 34. The hose 40 provides cool air from the blower housing 44 to the motor 28 to prevent the motor 28 from overheating. A motor engaging end 43 of the hose 40 extends though an inlet aperture 42 in motor housing 34 in known fashion. The blower housing engaging end 46 of the hose 40 extends through the sidewall 32 into the blower housing 44 as shown in FIGS. 3 and 3A. As shown therein, the blower end 46 of the hose 40 includes a generally cylindrical wall having a groove 48 for receiving the sidewall 32 therein, a circumferential lip 50 extending into the blower housing and a stop wall 52 extending from the circumferential lip 50. The lip 50 has an exterior angled portion 54 which extends about half the circumference of the lip 50 and is disposed directly opposite from the stop wall 52. The lip 50 also includes an interior angled portion 56 with a generally flat area 55 between the exterior angled portion 54 and the interior angled portion 56. The interior angled portion 56 provides a ramped surface along which air flow from the plenum travels into the hose 40. This interior angled portion 56 prevents a "dead zone" from forming at any portion of the lip 50 or hose 40. The stop wall 52 also extends about half the circumferential distance around the lip 50.

Figure 4:
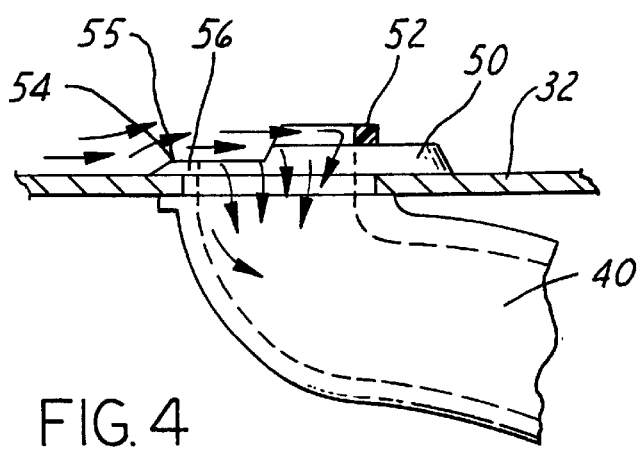
FIG. 4 is a cross-sectional view of the device of FIG. 3 secured into an air conditioning plenum.

In operation, and as shown in FIG. 4, the motor 28 rotates the climate control system blower wheel 30 to provide forced ventilation to the motor vehicle passenger compartment. As the air flows past the hose 40 in the blower housing 44, the air glides along the angled portion 54 of the circumferential lip 50, over flat portion 55 and some air begins traveling along interior angled surface 56 into hose 40. Another portion of the air flows over the aperture of the hose and is stopped at stop wall 52. From the stop wall 52, the air travels down into the hose 40 to the motor 28 where the air circulates to prevent the motor from overheating.

From the foregoing description, one ordinarily skilled in the art can easily ascertain the essential characteristics of the present invention, and without departing from the spirit and scope thereof, can make changes and modifications in the invention to adapt it to various usages and conditions. For example, as shown in FIG. 3, the hose 40 also includes a flexible connector 60 which can be used for holding wires or other conduits thereto. Also, the hose 40 can be made from various alternative elastomeric or polymeric materials. The angled portion 54 of lip 50 may extend from three to 45 degrees from the plane of the sidewall. Other means for providing air through the hose to the motor will be readily apparent to one ordinarily skilled in the art.

What is claimed is:

1. An apparatus for providing air flow to a motor for driving a climate control system air blower; comprising:
    a motor housing having an inlet port disposed in a wall thereof;
    a blower housing having an outlet port in a wall thereof;
    a conduit for communicating air from said blower housing outlet port to the motor housing inlet port, the conduit including a motor housing end and a blower housing end and a predetermined length of hose therebetween; and
    said blower housing end extending through said housing wall and into said blower housing and defining a generally cylindrical wall, said generally cylindrical wall having an angled portion and a stop wall portion opposite said angled portion.

2. An apparatus according to claim 1, wherein said stop wall portion of said generally cylindrical wall extends approximately 180 degrees around a circumference of said wall.

3. An apparatus according to claim 1, wherein said angled portion of said generally cylindrical wall includes an exterior angled portion, an interior angled portion and a generally flat portion disposed there between, said angled portions extending approximately 180 degrees around a circumference of said wall.

4. An apparatus according to claim 3, wherein said exterior angled portion of said generally cylindrical wall extends at an angle of between three and 45 degrees to a plane of the blower housing wall.

5. An apparatus according to claim 1, further including a circumferential groove formed in said generally cylindrical wall, said groove being configured to receive a portion said blower housing therein.

6. An apparatus according to claim 1, wherein said conduit is manufactured from an elastomeric material.

7. A conduit for providing air flow from an air conditioning housing including a wall to a motor for driving a climate control system air blower, the blower being disposed in the air conditioning housing, the motor including a motor housing inlet port for admitting the air flow to the interior of the motor, the conduit comprising:
    a generally cylindrical hose member having a motor housing end and a blower housing end, said blower housing end extending through said blower housing wall and into said blower housing and defining a generally cylindrical wall, said generally cylindrical wall having an angled portion and a stop wall portion opposite said angled portion.

8. An apparatus according to claim 7, wherein said stop wall portion of said generally cylindrical wall extends approximately 180 degrees around a circumference of said wall.

9. An apparatus according to claim 8, wherein said angled portion of said generally cylindrical wall includes an exterior angled portion, an interior angled portion and a generally flat portion disposed there between, said angled portions extending approximately 180 degrees around a circumference of said wall.

10. An apparatus according to claim 9, wherein said exterior and interior angled portions of said generally cylindrical wall both extend at an angle of between three and 45 degrees to a plane of the blower housing wall.

11. An apparatus according to claim 7, further including a circumferential groove formed in said generally cylindrical wall, said groove being configured to receive a portion said blower housing therein.

12. An apparatus according to claim 11, wherein said conduit is manufactured from an elastomeric material.

13. A conduit for providing air flow from an air conditioning housing including a wall to a motor for driving a climate control system air blower, the blower being disposed in the air conditioning housing, the motor including a motor housing inlet port for admitting the air flow to the interior of the motor, the conduit comprising:
    a generally cylindrical, elastomeric hose member having a motor housing end and a blower housing end, said blower housing end extending through said blower housing wall and into said blower housing and defining a generally cylindrical wall, said generally cylindrical wall having an angled portion and a stop wall portion opposite said angled portion, said stop wall portion of said generally cylindrical wall extending approximately 180 degrees around the circumference of said wall, said angled portion of said generally cylindrical wall including an exterior angled portion, an interior angled portion and a generally flat portion disposed therebetween, said angled portions extending approximately 180 degrees around a circumference of said wall at an angle of between three and 45 degrees to a plane of the blower housing wall.

14. An apparatus according to claim 13, further including a circumferential groove formed in said generally cylindrical wall, said groove being configured to receive a portion said blower housing therein.

* * * * *